United States Patent
Murphy et al.

(10) Patent No.: US 8,130,931 B2
(45) Date of Patent: Mar. 6, 2012

(54) CALL WAITING USING EXTERNAL NOTIFICATION AND PRESENCE DETECTION

(75) Inventors: Stephen Vaughan Murphy, Ashburn, VA (US); Bradford L. Spencer, Halifax (CA)

(73) Assignee: AOL Inc., Dulles, VA (US)

( * ) Notice: Subject to any disclaimer, the term of this patent is extended or adjusted under 35 U.S.C. 154(b) by 1253 days.

(21) Appl. No.: 11/830,215

(22) Filed: Jul. 30, 2007

(65) Prior Publication Data

US 2007/0274497 A1 Nov. 29, 2007

Related U.S. Application Data

(63) Continuation of application No. 10/747,256, filed on Dec. 30, 2003, now Pat. No. 7,260,205.

(60) Provisional application No. 60/488,386, filed on Jul. 21, 2003.

(51) Int. Cl.
*H04M 3/42* (2006.01)

(52) U.S. Cl. ......... 379/215.01; 379/201.01; 379/201.02; 379/201.05; 379/211.02; 379/211.04

(58) Field of Classification Search ............. 379/211.02, 379/201.01, 201.02, 201.05, 211.04, 215.01
See application file for complete search history.

(56) References Cited

U.S. PATENT DOCUMENTS 5,329,578 A 7/1994 Brennan et al.

(Continued)

FOREIGN PATENT DOCUMENTS

| EP | 1 298 900 | 4/2003 |
|---|---|---|
| WO | 99/23807 | 5/1999 |
| WO | 00/60809 | 10/2000 |
| WO | 02/078368 | 10/2002 |

OTHER PUBLICATIONS

Anonymous: "Does the Internet Have Call Waiting?", Internet Document, [Online] Copyright 2002, Tech TV, Inc., pp. 1-2, Retrieved from the Internet: www.techtv.com/screensavers/print/ 0,23102,2256423,00.html, [retrieved on Oct. 2, 2002].

Anoymous: "Did Someone Just Call You?", Internet Document, [Online] Copyright 2002, CallWave, Inc., p. 1, Retrieved from the Internet: www.callwave.com, [retrieved on Oct. 2, 2002].

Anonymous: "Internet Answering Machine™ Software", Internet Document, [Online] Copyright 2002, CallWave, Inc. pp. 1-2, [Retrieved from the Internet: www.callwave.com/findoutmore. asp?ct=hpl_fom, Oct. 2, 2002].

(Continued)

*Primary Examiner* — Ahmad Matar
*Assistant Examiner* — Khai N Nguyen
(74) *Attorney, Agent, or Firm* — Finnegan, Henderson, Farabow, Garrett & Dunner LLP

(57) ABSTRACT

Alerting an intended recipient of a phone call includes identifying an account based on a phone call received from a caller and accessing configuration data related to the account. The configuration data is used to identify an identity associated with the account. One or more external online service provider systems are queried across a network to determine whether the identity is available to receive an electronic communication associated with the phone call. The electronic communication associated with the phone call is sent across the network to the one or more external online service provider systems conditioned on whether the identity is determined to be available to receive the electronic communication. The one or more external online service provider systems send the electronic communication to the identity.

38 Claims, 7 Drawing Sheets

U.S. PATENT DOCUMENTS

| | | | |
|---|---|---|---|
| 5,375,161 A | | 12/1994 | Fuller et al. |
| 5,422,942 A | | 6/1995 | Kakwashima |
| 5,537,467 A | | 7/1996 | Cheng et al. |
| 5,548,636 A | | 8/1996 | Bannister et al. |
| 5,557,659 A | | 9/1996 | Hyde-Thomson |
| 5,651,054 A | | 7/1997 | Dunn et al. |
| 5,703,943 A | | 12/1997 | Otto |
| 5,805,587 A | | 9/1998 | Norris et al. |
| 5,809,128 A | | 9/1998 | McMullin |
| 5,841,966 A | | 11/1998 | Irribarren |
| 5,848,134 A | | 12/1998 | Sekiguchi et al. |
| 5,875,240 A | * | 2/1999 | Silverman ............ 379/142.07 |
| 5,894,504 A | | 4/1999 | Alfred et al. |
| 5,937,051 A | | 8/1999 | Hurd et al. |
| 6,038,293 A | | 3/2000 | McNerney et al. |
| 6,144,644 A | | 11/2000 | Bajzath et al. |
| 6,215,857 B1 | | 4/2001 | Kasiviswanathan |
| 6,282,275 B1 | | 8/2001 | Gurbani et al. |
| 6,295,341 B1 | | 9/2001 | Muller |
| 6,301,609 B1 | | 10/2001 | Aravamudan et al. |
| 6,311,231 B1 | | 10/2001 | Bateman et al. |
| 6,353,660 B1 | | 3/2002 | Burger et al. |
| 6,356,633 B1 | | 3/2002 | Armstrong |
| 6,363,258 B1 | | 3/2002 | Schmidt et al. |
| 6,366,661 B1 | | 4/2002 | Devillier et al. |
| 6,373,836 B1 | | 4/2002 | Deryugin et al. |
| 6,377,668 B1 | | 4/2002 | Smock et al. |
| 6,389,007 B1 | | 5/2002 | Shenkman et al. |
| 6,404,747 B1 | | 6/2002 | Berry et al. |
| 6,421,425 B1 | | 7/2002 | Bossi et al. |
| 6,463,145 B1 | | 10/2002 | O'Neal et al. |
| 6,477,246 B1 | | 11/2002 | Dolan et al. |
| 6,496,501 B1 | | 12/2002 | Rochkind et al. |
| 6,518,994 B1 | | 2/2003 | Johnson et al. |
| 6,532,286 B1 | | 3/2003 | Burg |
| 6,587,555 B1 | | 7/2003 | Cripe et al. |
| 6,631,399 B1 | | 10/2003 | Stanczak et al. |
| 6,639,980 B1 | * | 10/2003 | Weiss et al. ............ 379/201.02 |
| 6,671,365 B2 | | 12/2003 | Kemppainen |
| 6,724,867 B1 | | 4/2004 | Henderson |
| 6,738,461 B2 | | 5/2004 | Trandal et al. |
| 6,775,378 B1 | | 8/2004 | Villena et al. |
| 6,876,632 B1 | | 4/2005 | Takeda |
| 7,076,041 B2 | | 7/2006 | Brown et al. |
| 2002/0075304 A1 | | 6/2002 | Thompson et al. |
| 2003/0086432 A1 | | 5/2003 | Bartfeld et al. |
| 2003/0112931 A1 | | 6/2003 | Brown et al. |
| 2003/0112952 A1 | | 6/2003 | Brown et al. |
| 2003/0133558 A1 | | 7/2003 | Kung et al. |
| 2003/0215078 A1 | * | 11/2003 | Brahm et al. ............ 379/211.02 |
| 2003/0236820 A1 | | 12/2003 | Tierney et al. |
| 2004/0091089 A1 | | 5/2004 | Wynn |
| 2004/0141594 A1 | | 7/2004 | Brunson et al. |
| 2004/0141596 A1 | | 7/2004 | Crockett et al. |
| 2004/0170266 A1 | | 9/2004 | Adams et al. |
| 2004/0203589 A1 | * | 10/2004 | Wang et al. ............... 455/410 |
| 2005/0074107 A1 | | 4/2005 | Renner et al. |
| 2006/0080432 A1 | | 4/2006 | Spataro et al. |
| 2006/0088152 A1 | | 4/2006 | Green et al. |

OTHER PUBLICATIONS

Rick James: "Finally! Interactive 'Call Waiting' While You're Surfing?", Internet Document, [Online], pp. 1-4, Retrieved from the Internet: www.monitor.ca/monitor/issues/vol4iss12/feature7.html, [retrieved on Sep. 2, 2004].

International Search Report and the Written Opinion of the International Searching Authority, International Application No. PCT/US04/32562, dated Apr. 12, 2005, 9 pages.

* cited by examiner

CALL WAITING USING EXTERNAL NOTIFICATION AND PRESENCE DETECTION

CROSS REFERENCE TO RELATED APPLICATION

The application is a continuation of and claims priority from U.S. patent application Ser. No. 10/747,256, filed Dec. 30, 2003, and titled CALL WAITING USING EXTERNAL NOTIFICATION AND PRESENCE DETECTION which claims priority from U.S. patent application Ser. No. 10/674,797, filed Oct. 1, 2003, and titled MULTI-USER CALL WAITING and also to Provisional U.S. Patent Application No. 60/488,386, filed Jul. 21, 2003, and titled MULTI-USER CALL WAITING. The prior applications are incorporated herein by reference in their entirety. This application incorporates by reference U.S. patent application Ser. No. 10/414,167, filed Apr. 15, 2003, and titled COMMUNICATION DEVICE MONITORING, U.S. patent application Ser. No. 10/320,712, filed Dec. 17, 2002, and titled CASCADED DELIVERY OF AN ELECTRONIC COMMUNICATION, and U.S. patent application Ser. No. 10/674,821, filed Oct. 1, 2003, and titled INTELLIGENT CALL SCREENING OF TRADITIONAL TELEPHONY CALLS.

TECHNICAL FIELD

This document relates to a call waiting system that queries multiple external systems to determine the online presence of a call recipient and sends a call notification to the call recipient through one or more of the external systems.

BACKGROUND

Call waiting is a telephony service that allows call recipients to avoid missing calls that would otherwise be blocked due to the call recipient using or otherwise occupying the phone line. Call waiting informs call recipients of blocked incoming calls and enables call recipients to dispose of the blocked incoming call by, for example, either accepting the call or ignoring the call. Traditional call waiting systems used for voice based telephone interconnections typically inform call recipients of a blocked incoming call by inserting an audio cue (e.g., a short series of tones) into the voice path of the phone line. The call recipient hears the audio cue and may respond to the audio cue by suspending the conversation with the first caller to engage in conversation with the incoming or second caller.

DETAILED DESCRIPTION

Figure 1:
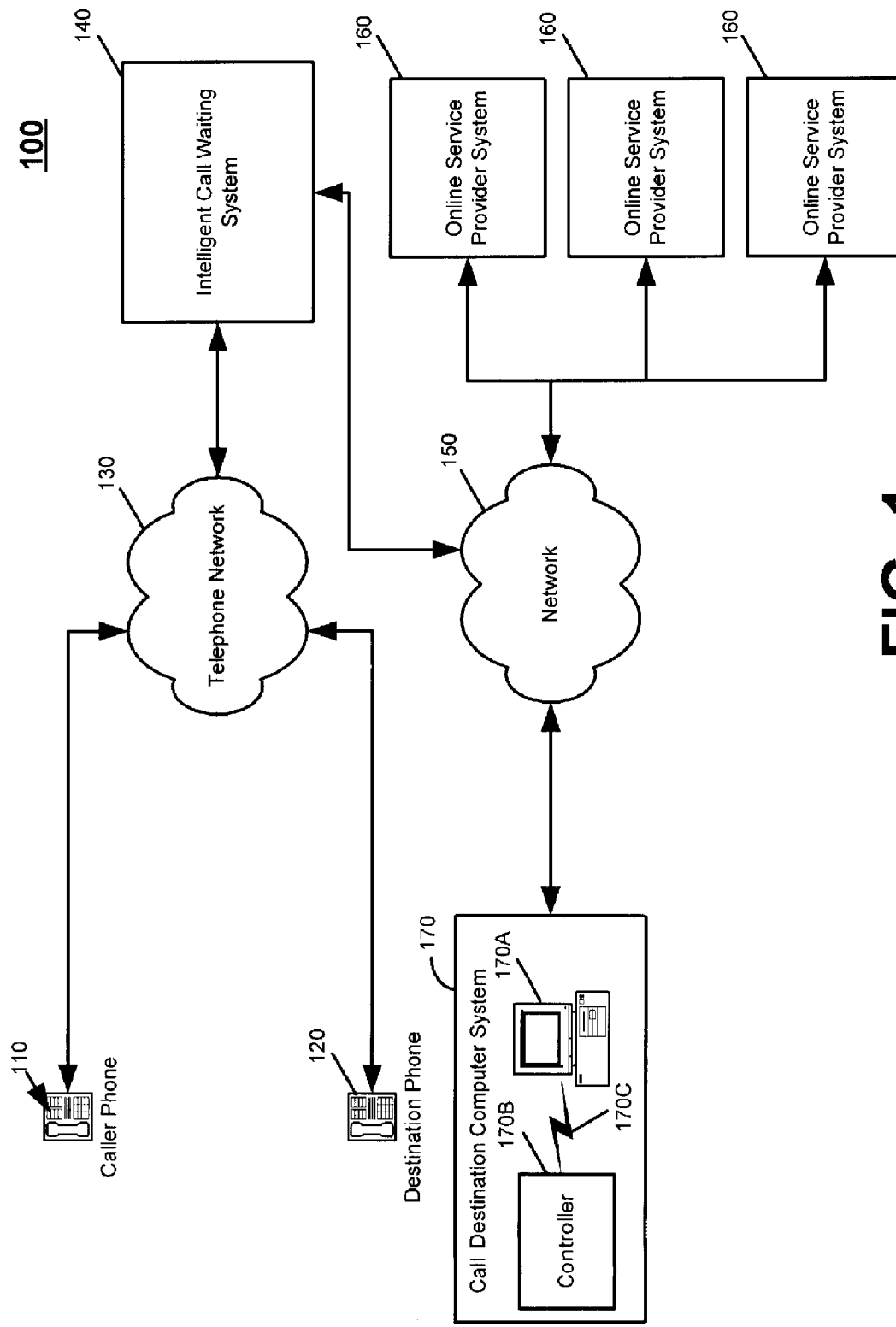
FIG. 1 is a block diagram of a communications system for providing intelligent call waiting.

A communications system directs an incoming call or sends information related to an incoming call to one or more identities associated with a called number who are available to receive such information through means other than telephones to which a telephone network ordinarily directs the incoming call. For example, when a call recipient is engaged in a call on a landline phone to which an incoming call is directed, a notification of the incoming call is sent to user identities associated with the direct number of the landline phone. The user identities may be respectively online through, for example, (1) a home computer, (2) a personal digital assistant (PDA), and (3) an office computer. Each user identity may be presented with call handling options enabling the user corresponding to the user identity to ignore the call, take a message, play a specific audio message, or forward the call to another phone number. The call handling options may be the same for each user or may vary based on location, login mode, or equipment. For example, with limited capabilities, the PDA user may receive only a visual indication of the incoming call and may only be able to forward the call to one other phone number. In contrast, the home computer user may receive much more caller identity information including address and return phone number and may choose from a wider variety of options including the option to play various audio messages, take a message, and forward the call to a phone number selected by the user from a large number of possible phone numbers.

In one implementation, a communications system for providing intelligent call waiting includes a caller phone configured to place a call to a call destination phone across a telephone network. The telephone network is configured to forward the call to an intelligent call waiting system if the direct number of the call destination phone is busy, not answered after a predetermined number of rings, or otherwise configured to not receive incoming calls. The intelligent call waiting system receives the call and determines one or more identities associated with the direct number of the call destination phone. The identities are user identifiers, such as, for example, screen names, through which a user's online status may be determined.

The intelligent call waiting system accesses call waiting preferences corresponding to the identity or identities and identifies which of the identities may receive a call notification message, e.g., based on the call waiting preferences. The intelligent call waiting system then determines which of the identified identities are online (and thus available to receive a call notification message). Rather than or in addition to tracking presence information like typical Internet call waiting systems, the intelligent call waiting system queries one or more external online service provider systems for presence information corresponding to each identified identity. Upon receiving the presence information from the one or more online service provider systems, the intelligent call waiting system generates a call notification message for each identified identity that is determined to be online. Then, where necessary and again in contrast with conventional Internet call waiting systems, the intelligent call waiting system does not send the call notification messages directly to call recipients. Rather, the intelligent call waiting system sends or publishes the call notification messages to one or more of the online service provider systems which, in turn, send the call notification messages to the recipients.

The online service provider systems receive the call notification messages and send in real time the received call notification messages along with format data to the call destination computer systems corresponding to the identified identities that are online. The call destination computer systems receive the call notification messages and format data, and respond by enabling user perception of the call notification messages.

A call notification message typically includes the identity of the caller (determined based on, for example, Automatic Number Identification (ANI) information) and a set of options that may be selected by the user to indicate how the call should be handled. Several options that may be selected include playing a specific audio message, ignoring the call, taking a message (i.e., forwarding a call to a voicemail system), and/or forwarding the call to another phone number (e.g., a cell phone number). The call notification message may be presented to a user as a dialog box in a visual display of the call destination computer system. The user may, for example, use a mouse or other input device to click or otherwise select an option presented in the dialog box.

When an option is selected by the user, the option selection is sent to the intelligent call waiting system in real time through the online service provider system. The intelligent call waiting system processes the call by sending call handling instructions to the telephone network and/or accessing and sending an audio message to the caller phone. Since multiple users may receive call notification messages corresponding to the same call and may select conflicting options, the intelligent call waiting system may employ a conflict resolution algorithm to process the received option selection data. Otherwise, conference calling may ensue.

Referring to FIG. 1, in one implementation, a communications system 100 for providing intelligent call waiting includes a caller phone 110, a call destination phone 120, a telephone network 130, an intelligent call waiting system 140, a network 150, one or more online service provider systems 160, and a call destination computer system 170. The call destination computer system includes a device 170A that communicates with a controller 170B over a data pathway 170C.

The caller phone 110 is configured to place a call to the call destination phone 120 across the telephone network 130. The caller phone 110 and the call destination phone 120 may be landline phones that allow communications over the telephone network 130. In another implementation, the caller phone 110 and/or the call destination phone 120 may be a cellular phone or a mobile personal digital assistants (PDAs) with embedded cellular phone technology. In yet another implementation, the call destination phone 120 may integrate the call destination computer system 170 and operate as a single computer system.

The telephone network 130 is configured to enable direct or indirect voice communications between the caller phone 110, the call destination phone 120, and the intelligent call waiting system 140. If a user of the caller phone 110 places a call to the call destination phone 120 and the direct number corresponding to the call destination phone 120 is busy or not answered after a predetermined number of rings, the telephone network 130 is configured to forward the call to the intelligent call waiting system 140 (i.e., a call forward busy/no answer service is enabled on the phone line of the call destination phone 120).

When the call is forwarded to the intelligent call waiting system 140, the telephone network 130 is configured to send call-related information to the intelligent call waiting system 140 over a signaling channel. The call-related information includes call origin and call destination information. The call origin information may include the direct number of the caller phone 110 and the time and date when the call was initiated, and the call destination information may include the direct number of the call destination phone 120. The call origin information may be delivered, for example, through a service known as Automatic Number Identification (ANI), and the call destination information may be delivered, for example, by extracting called number information from the integrated services digital network (ISDN) call setup or, alternatively, through a service known as Dialed Number Identification Service (DNIS).

The telephone network 130 also is configured to receive call handling instructions from the intelligent call waiting system 140. The call handling instructions are instructions that tell the telephone network 130 how to process a call. The call handling instructions may include, for example, instructions to accept a call, refuse a call, and forward a call to another telephone number (e.g., to a telephone number corresponding to a voicemail system or a different telephone).

The telephone network 130 may include a circuit-switched voice network, a packet-switched data network, or any other network able to carry voice. For example, circuit-switched voice networks may include the Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications.

The intelligent call waiting system 140 is a computer system configured to receive a call from the caller phone 110 that has been forwarded to the intelligent call waiting system 140 by the telephone network 130. The intelligent call waiting system 140 receives the call destination direct number from the telephone network 130, identifies one or more identities associated with the call destination direct number, and processes the call in accordance with account-level and identity-level call waiting preferences associated with the call destination direct number. The identities associated with the call destination direct number may be identified, for example, by accessing an account record indexed by the call destination direct number and stored in a configuration data store. The account record includes the identities and the account-level and identity-level call waiting preferences.

The account-level call waiting preferences are preferences that are not associated with any particular identity but rather are associated with all identities. For example, account-level call waiting preferences may include a "black list" of identified phone numbers and a "white list" of identified phone numbers. If the intelligent call waiting system 140 receives a call from a caller phone 110 having a direct number on the "black list," the intelligent call waiting system 140 may ignore the call (i.e., the call is not answered and is allowed to continuously ring) or, alternatively, may send a message to the telephone network 130 or the caller phone 110, e.g., an audio message, telling the caller not to call the direct number of the call destination phone 120 anymore or an electronic message to the telephone network 130 that inspires an audio message to the cellular phone 110 indicating unavailability of the call destination phone 120. If the intelligent call waiting system 140 receives a call corresponding to a direct number on the "white list," the intelligent call waiting system 140 may automatically forward the call to another number (e.g., a specified cell phone number or voicemail number).

The identity-level call waiting preferences are preferences that are tailored to each identity. The identity level preferences include, for example, instructions prohibiting the intelligent call waiting system 140 from sending a call notification message to a particular identity when the direct number of the caller phone 110 has been placed on a prohibited list for that identity. Each identity may have its own prohibited and/or white lists. The identity-level preferences also may include instructions regarding how the call notification message sent to an identity should be formatted and what options should appear in the call notification message.

The identity-level call waiting preferences may include notification distribution preferences. The notification distribution preferences are identity-level settings that identify the online service provider systems that offer service to a particular user identity and also identify the online service provider system(s) to whom call notification messages should be directed when multiple online service provider systems report to the intelligent call waiting system that the particular identity is online or otherwise available to receive a call notification message. For example, a user may setup a call notification message distribution preference that specifies that if his or her computer is logged into a first instant messaging system and his or her mobile phone is logged into a second instant messaging system, the second instant messaging system should receive a call notification message and, thereby, alert the user of the call, and the first instant messaging system should not receive a call notification message. Alternatively, the distribution preferences may be setup such that both the first and second instant messaging systems receive a call notification message and thereby alert the user of the call via both the computer and the mobile phone of the user.

The identity-level call waiting preferences may further include parental controls. For example, some identities may correspond to children and other identities may correspond to parents. The call waiting preferences of identities corresponding to children may include instructions prohibiting the intelligent call waiting system 140 from sending call notification messages to those identities when they are online or, alternatively, from sending call notification messages to those identities when they are online during certain times of the day (e.g., late at night or when the child is at school).

For example, the Smith account may include two identities associated with it, "jillsmith2" corresponding to a user named Jill and "joesmith3" corresponding to a user named Joe. The Smith account has placed phone numbers of various telemarketing businesses on a "black list" and the phone number of Joe's parents on a "white list." Accordingly, the account-level preferences are set to ignore calls from the telemarketing businesses and forward calls from Joe's parents to Joe's cell phone number. Furthermore, the identity-level preferences for "jillsmith2" are set such that the notification message presented to Jill includes the following options: ignore the call, take a message, and send an audio message stating, "Please call back later." The identity-level preferences for "joesmith3" are set such that the notification message presented to Joe includes the following options: ignore the call, take a message, forward the call to Joe's cell phone, and send an audio message. If the option selected is to send an audio message, Joe is presented with a menu from which he may select one of the following audio messages: "Please call back later," "I'll call you back," "I don't know you," and "Please call my cell phone at (202) 123-4567." Joe and Jill may have recorded the audio messages in their own voice to personalize the messages or, alternatively, may have chosen the messages from a list of prerecorded audio messages. In another implementation, Joe may have included the sending of an audio message stating, "You are being transferred to my cell phone" prior to the forwarding of the call to his cell phone.

The intelligent call waiting system 140 processes the call by identifying which identity or identities may receive a call notification message based on the account-level and identity-level call waiting preferences. The system 140 requests the online status of the identified identities from one or more online service provider systems 160, and call notification messages for each identified identity that is online are generated in accordance with the identity-level preferences. The intelligent call waiting system 140 sends the call notification messages to the one or more online service provider systems 160 based on the notification distribution preferences for each identity. The one or more online service provider systems 160 send the call notification message or messages, along with format data, over the network 150 to one or more call destination computer systems 170 for presentation to users. Each user of a call destination computer system 170 selects an option presented in the call notification message, and the option selection is sent to the online service provider system 160 over the network 150. The online service provider system 160 relays the option selection to the intelligent call waiting system 140, which processes the option selection accordingly.

If no user of a call destination computer selects an option prior to expiration of a predetermined interval of time (e.g., 15 seconds), the intelligent call waiting system 140 may process a default option selection. The default option selection may be stored as an account-level preference and may correspond to sending an audio message, taking a message (i.e., forwarding the call to a voicemail system), and/or forwarding the call to another number (e.g., a cell phone number).

If multiple user identities submit option selections for the same call, the intelligent call waiting system 140 applies a conflict resolution algorithm to determine which option selection of the several received option selections will be processed. The conflict resolution algorithm may be, for example, a "first come, first serve" algorithm that processes the call in accordance with the first option selection received. Alternatively, the conflict resolution algorithm may include collecting option selections corresponding to different identities over a predetermined interval of time and then processing the call in accordance with the option selection corresponding to the identity assigned the highest rank. The rank assignment for each identity typically is stored as an identity-level preference. As another alternative, the conflict resolution algorithm may include processing the call in accordance with a ranking of the option selections. For example, the option selections may be ranked according to how responsive the option selections are to the call, such that an option selection that forwards the call to another number would be selected over an option selection that sends a message asking the caller to call back.

If a single user identity submits multiple option selections (e.g., by submitting each option selection over a different online service provider system 160), the intelligent call waiting system 140 may apply a conflict resolution algorithm to determine which of the multiple option selections received from the same user identity is processed. For example, the conflict resolution algorithm may be a "first come, first serve" algorithm (i.e., the first option selection received from the user identity is processed) or it may be an option selection rank-based algorithm as discussed before.

The intelligent call waiting system 140 processes an option selection by sending a call handling instruction to the telephone network 130 and/or sending an audio message to the caller phone 110 over the telephone network 130. The intelligent call waiting system 140 is configured to record, store, access, and play or redirect audio messages. The audio messages may be personalized by subscribers to the intelligent call waiting services and may be stored in a data store and indexed, for example, by direct number of the subscriber call destination phone.

The network 150 is configured to enable direct or indirect communications between the intelligent call waiting system 140, the one or more online service provider systems 160, and one or more call destination computer systems 170. Examples of the network 150 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data.

In some implementations, the network 150 and the telephone network 130 are implemented by a single or otherwise integrated communications network configured to enable voice communications between the caller phone 110, the call destination phone 120, and the intelligent call waiting system 140, and to enable communications between the intelligent call waiting system 140, the one or more online service provider systems 160, and the one or more call destination computer systems 170.

The online service provider systems 160 are computer systems configured to provide online data communications services to users, detect online presence of users of call destination computer systems 170, receive call notification messages from the intelligent call waiting system 140, generate format data and send the format data along with the call notification messages to call destination computer systems 170, and send option selections from the call destination computer systems 170 to the intelligent call waiting system 140. The online data communications services may include for example, e-mail services, instant messaging services, Internet access, and/or access to online content.

The online service provider system 160 may detect online presence of users of call destination computer systems 170 in, for example, a manner similar to that used to detect presence in an Instant Messaging system and/or in a manner similar to that disclosed in application Ser. No. 10/414,167, hereby incorporated by reference in its entirety (in which client-side communication device monitors are used). The online service provider systems 160 also are configured to receive call notification messages from the intelligent call waiting system 140, generate format data that is used to format the call notification message for presentation on the call destination computer systems 170, and send the call notification messages to the call destination computer systems 170 in real time.

The format data may vary based on device type. For example, with limited capabilities, the format data for a PDA may enable the PDA to limit the call notification message to a visual indication of the incoming call (e.g., illumination of a light and a graphical display of a call icon and the caller phone direct number or identity proxy thereof) and may further limit the call handling options that are presented to the user to a subset of the full suite of options (e.g., the option to forward the call to one other phone number). In contrast, the format data sent to a home computer may enable the home computer to provide, for example, an audio and visual indication of the call and to display full caller identity information including address, return phone number, and other information about the caller accessible based on the caller phone number. The format data sent to the home computer also may enable the home computer to present to the user a significantly larger number of call handling options (e.g., the option to play various audio messages, take a message, and forward the call to a phone number selected by the user from a large number of possible phone numbers).

The online service provider systems 160 also are configured to transmit in real time the option selections from the call destination computer systems 170 to the intelligent call waiting system 140. Since the caller is waiting on the caller phone 110 during the generation and transmission of call notification messages, the selection of options by users of call destination computer systems 170, and the transmission processing of corresponding option selections, the online service provider system 160 is configured to send information to and receive information from the call destination computer systems 170 in real time. Accordingly, the online service provider systems 160 may be configured to avoid queuing call notification messages or option selections or to avoid further processing the call notification messages or option selections in any way that increases transmission delay. The online service provider systems 160 may be configured to provide this functionality in a manner similar to that used by instant messaging systems, or even to leverage instant messaging systems to enable transmission and receipt of instant messages in real time. The online service provider systems 160 also may be instant messaging systems.

The call destination computer system 170 is configured to receive call notification messages and format data from the online service provider systems 160, process the call notification messages in accordance with the format data to enable a user to perceive the call notification, accept user selection of one of the options offered by the call notification message, and send the option selection to the online service provider systems 160. The call destination computer system includes a device 170A capable of executing instructions under the command of a controller 170B. The device 170A may be a general purpose computer, such as a workstation or a personal computer, a PDA, a special purpose computer, an intelligent mobile phone, a pager, or a set top box.

The controller 170B commands and directs communications between the device 170A of the call destination computer system 170 and the online service provider system or systems 160. The controller 170B may include one or more software or hardware applications that enable digital communications to be received from the online service provider system or systems 160. For example, the controller 170B may be a modified instant messaging application configured to receive notification messages and send option selections in a manner similar to that used to receive instant messages and send instant messages. The device 170A is connected to the controller 170B by a wired, wireless or virtual (i.e., when the controller is software running on the device) data pathway 170C capable of delivering data.

Figure 2:
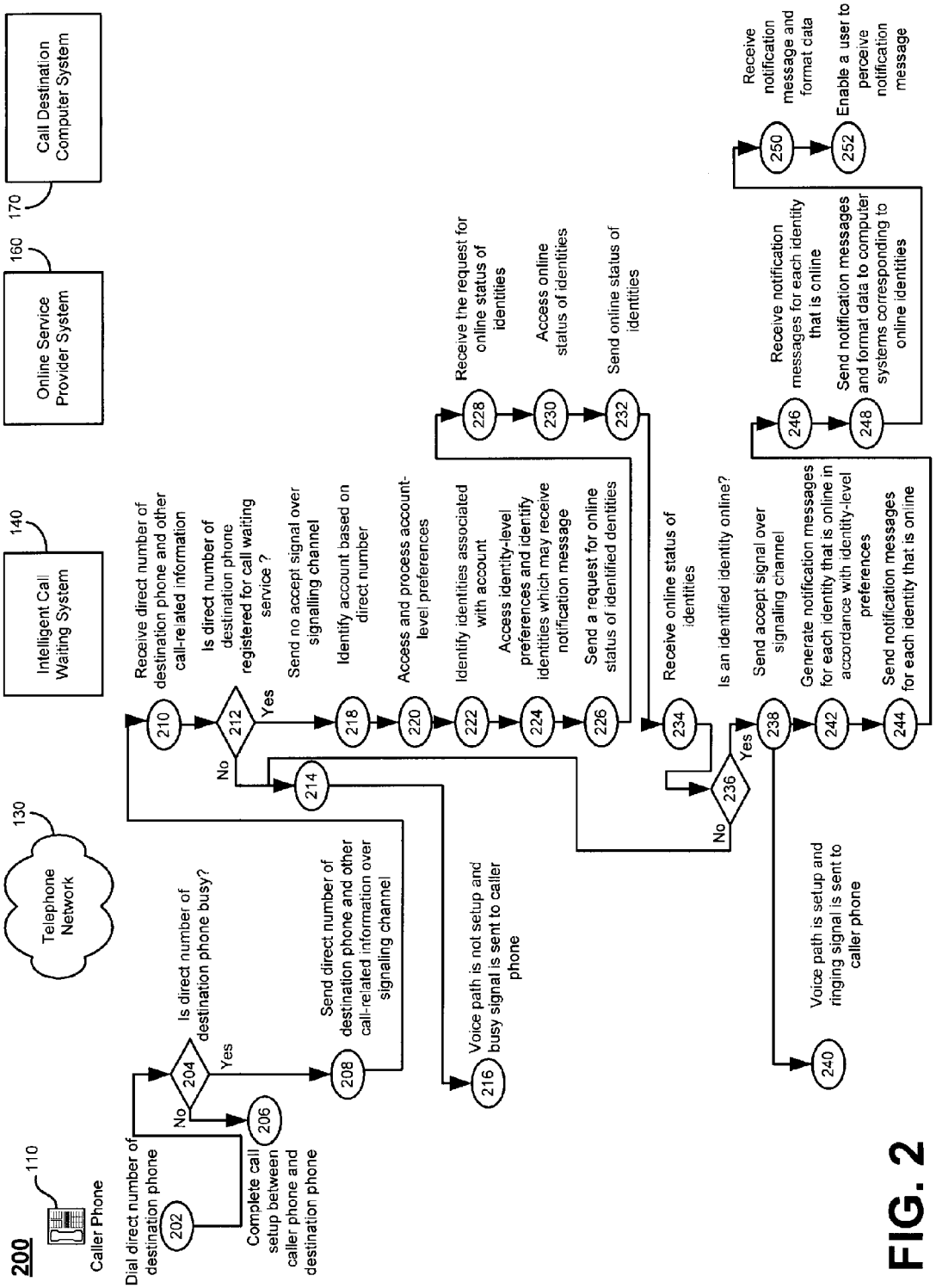
FIG. 2 is a flow chart illustrating a process for generating and delivering call notification messages.

FIG. 2 shows a process 200 for generating and delivering call notification messages. For convenience, particular components described with respect to FIG. 1 are referenced as performing the process 200. However, similar methodologies may be applied in other implementations where different components are used to define the structure of the system, or where the functionality is distributed differently among the components shown by FIG. 1. The process 200 is directed to generating and delivering call notification messages when the direct number of the call destination phone 120 is busy. However, a call notification message may additionally or alternatively be generated and delivered under various other conditions. For example, the call notification message may be generated and delivered when the call to the direct number of the call destination phone 120 is not answered after a predetermined number of rings, or, alternatively, the call notification message may be generated and delivered every time a call is directed to the direct number of the call destination phone 120, regardless of the phone line status.

The user of the caller phone 110 dials the direct number of the call destination phone 120 (202). The telephone network 130 determines whether the direct number of the call destination phone 120 is busy (204). If the direct number of the call destination phone is not busy, the telephone network 130 completes the call setup between the caller phone 110 and the call destination phone 120 (206).

If the direct number of the call destination phone 120 is busy, the telephone network 130 sends the call destination phone direct number and other call-related information over a signaling channel to the intelligent call waiting system 140 (208). The intelligent call waiting system 140 receives the direct number of the call destination phone 120 and the other call-related information (210) and determines whether the direct number of the call destination phone 120 is registered for the call waiting service (212). The intelligent call waiting system 140 may determine whether a direct number is registered for the call waiting service by accessing, for example, a registration data store indexed by phone numbers and storing records for those direct numbers that are receiving the call handling service.

If the direct number of the call destination phone 120 is not registered for the call handling service, the intelligent call waiting system 140 sends a "no accept" signal over the signaling channel to the telephone network 130 (214). In response to the no accept signal, the telephone network 130 sends a busy signal to the caller phone 110 and does not setup a voice path between the caller phone 110 and the intelligent call waiting system 140 (216). In another implementation, the intelligent call waiting system 140 instructs the telephone network 130 to redirect the voice path to a direct number corresponding to a voice messaging or voice mail system rather than instructing the telephone network 130 to send a busy signal.

If the direct number of the call destination phone 120 is registered for call handling service, the intelligent call waiting system 140 identifies an account based on the direct number of the call destination phone 120 (218) and accesses and processes account-level preferences (220). The account may be identified, for example, by accessing an account record stored in a configuration or registration data store and indexed by direct number of call destination phone 120. The account-level preferences also may be stored in the account record. For example, the "Smith" account may be stored in the configuration data store under 703-123-4567 and may include the user identities "JillSmith2" and "JoeSmith3". If the call is not disposed of by applying the account-level preferences (e.g., the direct number of the caller phone 110 is not on a white list or a black list), the intelligent call waiting system 140 identifies identities associated with the account (222) and accesses identity-level preferences (224). In one implementation, the identities associated with an account are stored in an account record while the identity-level preferences are stored in identity records associated with the account record. In another implementation, the identities and the identity-level preferences are stored in an account record.

The intelligent call waiting system 140 determines which identities may be able to receive a call notification message based on the identity-level preferences (e.g., the direct number of the caller phone 110 may be on the prohibited list of some of the identities or parental controls may prohibit some of the identities from receiving a call notification message) (224). The intelligent call waiting system 140 then determines which online service provider systems 160 offer services to each identified identity based on the corresponding notification distribution preferences and, sends a request to the appropriate online service provider systems 160 for the online status of the available identities (226).

The online service provider systems 160 receive the request for the online status of the available identity or identities (228) and accesses the online status of the available identity or identities (230). The online status of the identity or identities may be stored, for example, in a presence data store that is constantly updated in real-time in a manner similar to that used in instant messaging systems to reflect activity of a user at the call destination computer system 170. The online service provider systems 160 send the online status of the available identity or identities to the intelligent call waiting system 140 (232).

The intelligent call waiting system 140 receives the online status of the available identity or identities (234) and determines whether at least one identified identity is online (236). If no identified identities are online, process 200 proceeds to operation 214. If at least one identified identity is online, the intelligent call waiting system 140 sends an accept signal over the signaling channel to the telephone network 130 (238). In response to the accept signal, the telephone network 130 may send a ringing signal to the caller phone 110 and sets up a communications (e.g., voice) path with the caller phone 110 (240).

The intelligent call waiting system 140 generates a call notification message in accordance with identity-level preferences for each identified identity that is online (242). The intelligent call waiting system 140 sends the call notification messages for each identified identity that is online to one or more online service provider systems 160 in accordance with the notification distribution preferences of the corresponding identified identity (244). The call notification messages typically are sent out in parallel by the intelligent call waiting system 140 to minimize transmission delays and the arrival time difference between call destination computer systems 170.

The online service provider system or systems 160 receive the call notification messages (246) and sends the call notification messages along with format data to call destination computer systems 170 corresponding to the online identities (248). The receiving of the call notification messages and sending of the call notification messages and format data is performed in real time. The call notification messages typically are sent out in parallel by the online service provider systems 160 to minimize transmission delays and the arrival time difference between call destination computer systems 170.

Each call destination computer system 170 receives the call notification message and format data (250) and enables a user to perceive the call notification message (252). In one implementation, the call destination computer system 170 enables the user to perceive the call notification message as a pop-up window or dialog box that appears on a visual display of the call destination computer system 170.

Figure 3:
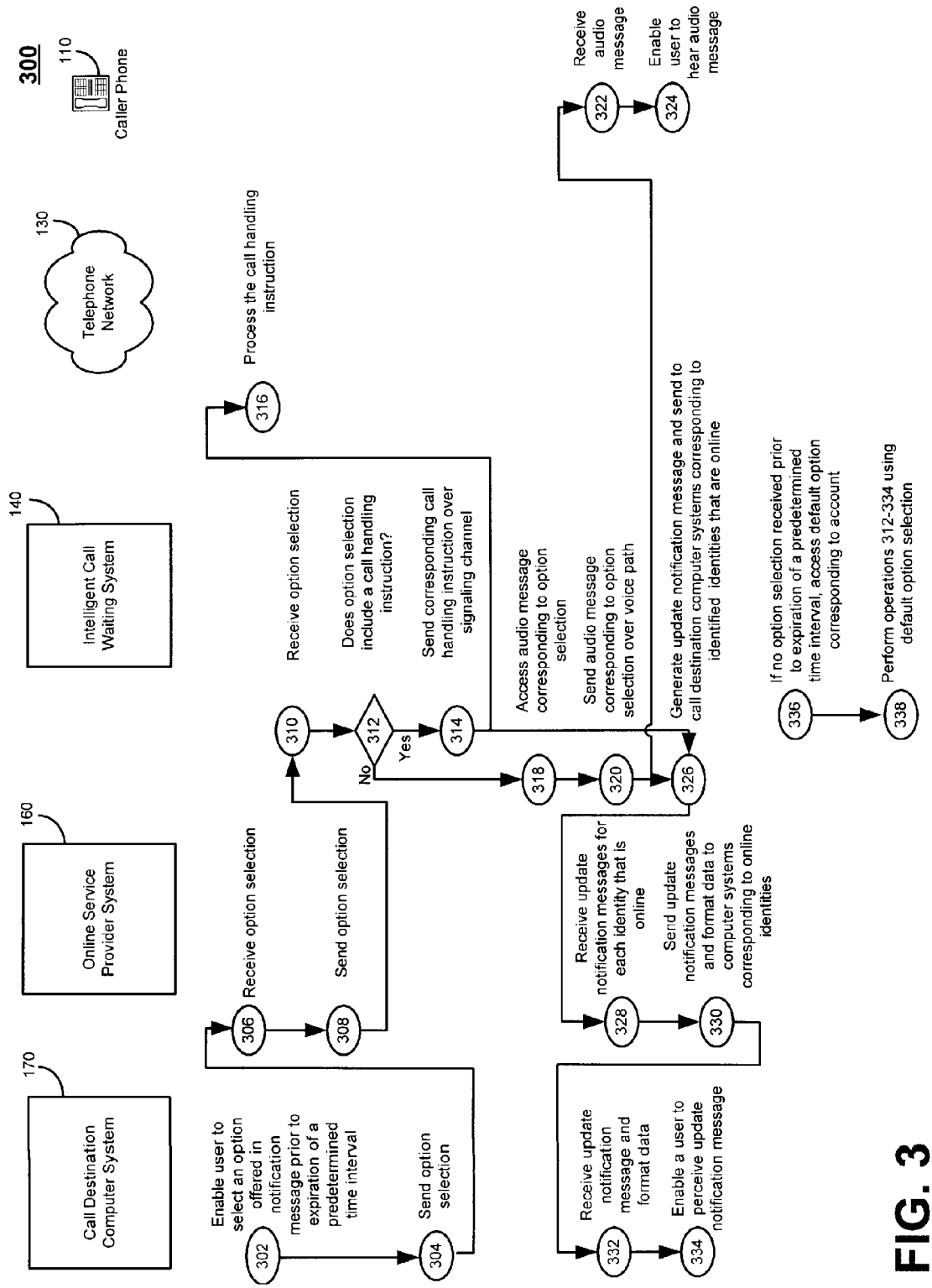
FIG. 3 is a flow chart illustrating a process for responding to a user selection of an option in a call notification message.

FIG. 3 shows a process 300 for responding to a user selection of an option in a call notification message. For ease of discussion, particular components described with respect to FIG. 1 are referenced as performing the process 300. However, similar methodologies may be applied in other implementations where different components are used to define the structure of the system, or where the functionality is distributed differently among the components shown by FIG. 1.

The call destination computer system 170 enables a user to select an option offered in the call notification message prior to expiration of a predetermined time interval (e.g., 15 seconds) (302). The call destination computer system 170 sends the option selection to the online service provider system 160 (304).

The online service provider system 160 receives the option selection (306) and sends the option selection to the intelligent call waiting system 140 (308), and does so in real time.

The intelligent call waiting system 140 receives the option selection (310). The process 300 employs a "first come, first serve" conflict resolution algorithm (i.e., the first option selection received is the option selection that will be used to process the call). In other implementations, such as an implementation in which a rank-based conflict resolution algorithm is used, the intelligent call waiting system 140 waits for a predetermined interval of time (e.g., 15 seconds) to receive option selections from multiple call destination computers 170, and selects one of the received options selections in accordance with the conflict resolution algorithm.

The intelligent call waiting system 140 determines whether the option selection includes a call handling instruction (i.e., an instruction to forward or ignore the call) (312). If the option selection includes a call handling instruction, the intelligent call waiting system 140 sends the call handling instruction to the telephone network 130 over the signaling channel (314). The telephone network 130 processes the call handling instruction and, if necessary, forwards or redirects the voice path accordingly (316). In some implementations, the intelligent call waiting system 140 accesses and sends an audio message over the voice path to the caller phone 110 prior to sending the call handling instruction to the telephone network 130 (e.g., the audio message "The phone you are calling is busy. Please stay on the line and you will be transferred to an alternative number." may be sent prior to sending the call handling instruction to forward the call).

If the option selection does not correspond to a call handling instruction, then the intelligent call waiting system 140 accesses an audio message corresponding to the option selection (318) and sends the audio message corresponding to the option selection over the voice path to the caller phone 110 (320). The caller phone 110 receives the audio message (322) and enables a user to hear the audio message (324).

After or contemporaneous with sending the call handling instruction to the telephone network 130 and/or sending an audio message to the caller phone 110, the intelligent call waiting system 140 generates an updated call notification message for each identified identity that is online and sends the updated call notification messages to the online service provider systems 160 in accordance with the notification distribution preferences for each identified identity (326). The online service provider systems 160 receive the updated call notification messages (328) and send the updated call notification messages to the corresponding call destination computer systems 170 (330).

Each call destination computer system 170 receives an updated call notification message (332) and enables a user to perceive the updated call notification message (334). In one implementation, the updated call notification message is presented to users as a dialog box or pop-up window that displays the option selection that was used for processing the call and the identity that submitted that option selection, if applicable (i.e., an identity is not shown if the call was processed in accordance with a default option selection as discussed below).

If the intelligent call waiting system 140 does not receive an option selection within a predetermined time interval from any of the call destination computer systems 170 that received call notification messages (e.g., at 306), the intelligent call waiting system 140 automatically accesses a default option selection corresponding to the account (and stored as an account-level preference) (336). The intelligent call waiting system 140 processes the default option selection in accordance with operations 312-334 (338).

Figure 4:
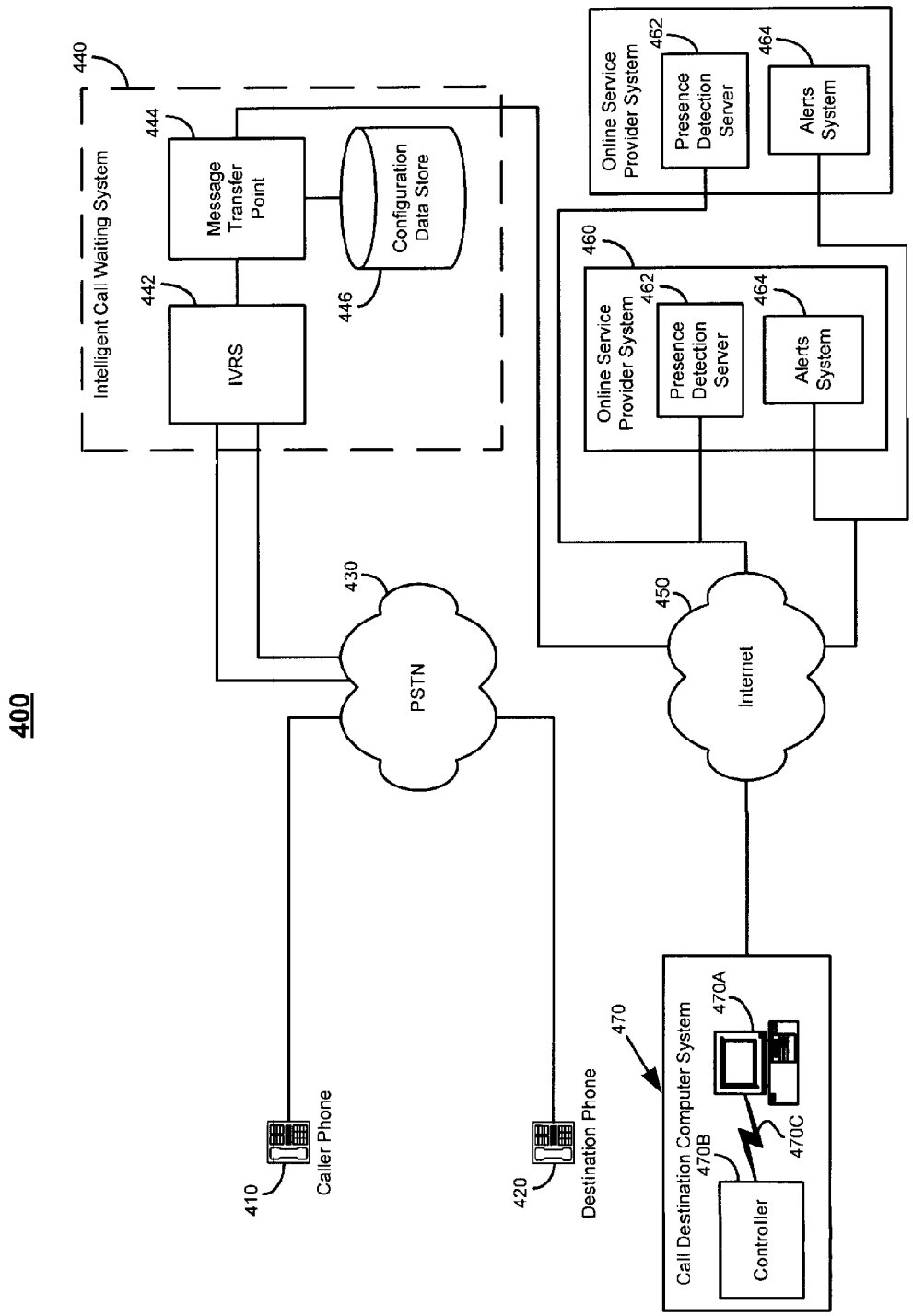
FIG. 4 is block diagram of an exemplary implementation of the communications system of FIG. 1 used for providing intelligent call waiting.

FIG. 4 shows one exemplary implementation 400 of the communications system 100 of FIG. 1 configured to provide intelligent call waiting. The communications system 400 includes a caller phone 410, a call destination phone 420, a telephone network 430, an intelligent call waiting system 440, a network 450, one or more online service provider systems 460, and one or more call destination computer systems 470. Each call destination computer system 470 includes a device 470A that communicates with a controller 470B over a data pathway 470C. Examples of each element within the communications system 400 of FIG. 4 are described broadly above with respect to FIG. 1. In particular, the caller phone 410, the call destination phone 420, the PSTN 430, the Internet 450, and the call destination computer systems 470 typically have attributes comparable to those described with respect to the caller phone 110, the call destination phone 120, the telephone network 130, the network 150, and the call destination computer systems 170 of FIG. 1, respectively. Likewise, the intelligent call waiting system 440 and the one or more online service provider systems 460 typically have attributes comparable to and illustrate one possible implementation of the intelligent call waiting system 140 and the one or more online service provider systems 160 of FIG. 1.

The intelligent call waiting system 440 includes an interactive voice response system (IVRS) 442, a message transfer point 444, and a configuration data store 446. The one or more online service provider systems 460 each include a presence server 462 and an alerts system 464.

The IVRS 442 is a telephony-facing computer system that sends call handling instructions to the PSTN 430 and stores, records, and sends audio messages to the caller phone 410 through the PSTN 430. The call handling instructions include, for example, accepting a call, rejecting a call, and redirecting a call. The IVRS 442 also sends call-related information to the message transfer point and receives instructions regarding which call handling instruction should be sent to the PSTN 430 and/or audio message should be accessed and sent through the PSTN 430.

The message transfer point 444 is an IP-facing computer system that validates a call received by the IVRS 442, generates and sends call notification messages to the alerts system 464, receives option selections from the alerts system 464, and sends instructions corresponding to the received option selections to the IVRS 442. The message transfer point 444 accesses the configuration data store 446 to validate a call received by the IVRS 442 and to access account-level and identity-level call waiting preferences. The message transfer point 444 also requests online status of identities from the presence servers 462 of the one or more online service provider systems 460.

The configuration data store 446 is a data storage device that is communicatively coupled to the message transfer point 444 and that includes account records and identity records. The account records store account-level call waiting preferences and may be indexed by subscriber phone number (i.e., the direct number of the call destination phone 420). The identity records store identity-level call waiting preferences and may be indexed by account number or by subscriber phone number.

The presence servers 462 of the online service provider systems 460 are servers that receive, update, and publish online presence data for each identity. The presence servers 462 enable the message transfer point 444 to access online status data for particular identities. In one implementation, the presence servers 462 are functionally similar to central servers in an instant messaging system that receive periodic online status updates from call destination computer systems 470. In another implementation, the presence servers 462 are functionally similar to the presence detection systems disclosed in application Ser. No. 10/414,167 that receive communication device status data and user availability to perceive communications data from a device monitor coupled to the device 470B of the call destination computer system 470. In this implementation, the message transfer point 444 includes the functionality of a device monitoring system.

The alerts systems 464 of the online service provider systems 460 are computer systems configured to enable real time or near real time transmission of call notification messages to call destination computer systems 470 from the message transfer point 444 and transmission of the option selections from call destination computer systems 470 to the message transfer point 444. The alerts systems 464 are configured to provide this functionality in a manner similar to that used by instant messaging systems to enable transmission and receipt of instant messages in real time. Such a system has been described, for example, in application Ser. No. 10/320,712, hereby incorporated by reference.

Figure 5A:
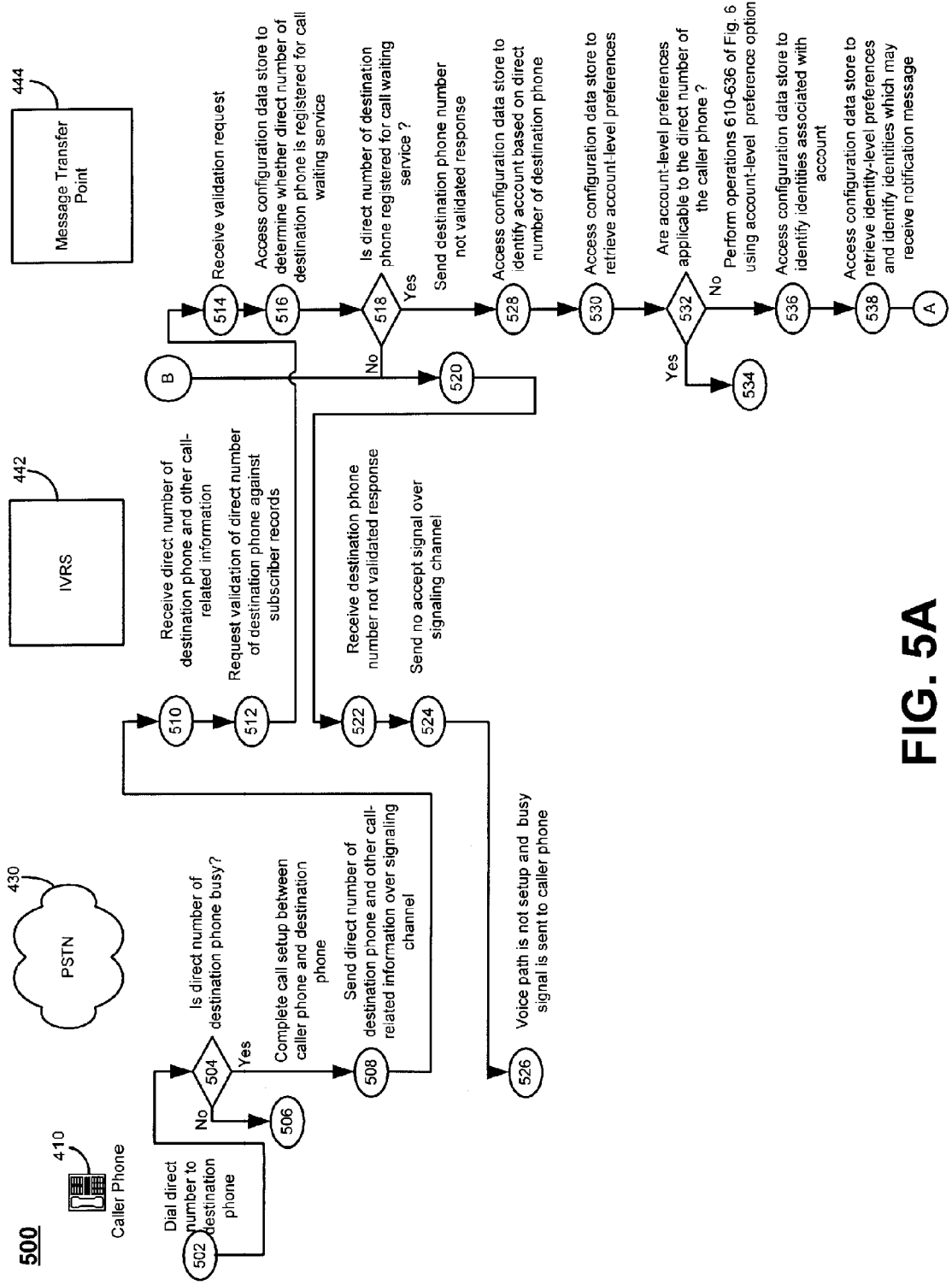
FIGS. 5A and 5B are flow charts illustrating a process for generating and delivering call notification messages.
Figure 5B:
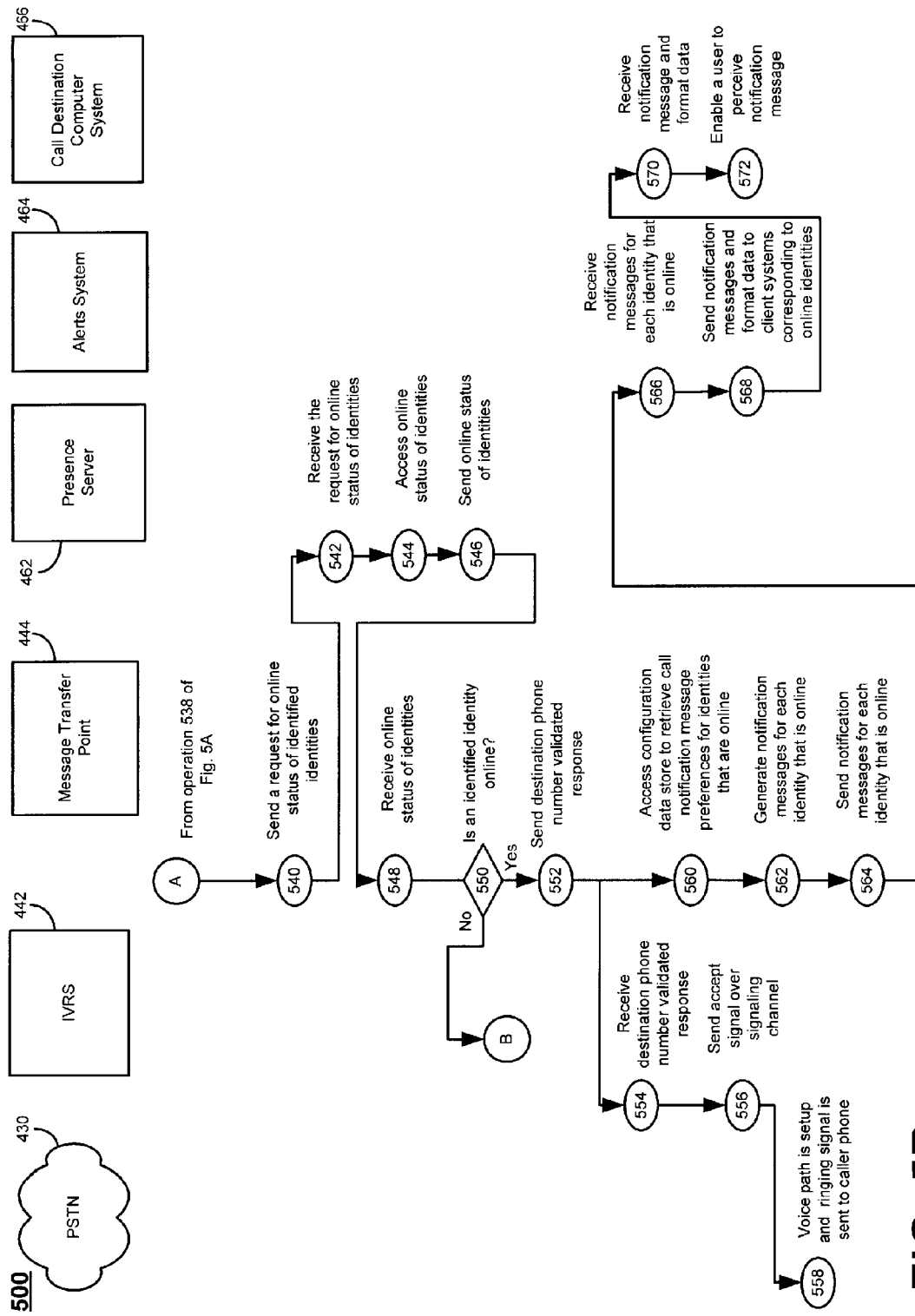

FIGS. 5A and 5B show a process 500 for generating and delivering call notification messages. For case of discussion, particular components described with respect to FIG. 4 are referenced as performing the process 500. However, similar methodologies may be applied in other implementations where different components are used to define the structure of the system, or where the functionality is distributed differently among the components shown by FIG. 4. Process 500 corresponds to process 200 but applied to the communications system 400 rather than to the communications system 100.

The user of the caller phone 410 dials the direct number of the call destination phone 420 (502). The PSTN 430 determines whether the direct number of the call destination phone 420 is busy (504). If the direct number of the call destination phone is not busy, no call waiting is necessary, and the PSTN 430 completes the call setup between the caller phone 410 and the call destination phone 420 (506).

If the direct number of the call destination phone 420 is busy, the PSTN 430 sends the call destination phone direct number and other call-related information over a signaling channel to the IVRS 442 (508). The IVRS 442 receives the direct number of the call destination phone 420 and the other call-related information (510) and sends a validation request to the message transfer point 444 to determine whether the direct number of the call destination phone 420 is registered for call waiting service (512).

The message transfer point 444 receives the validation request (514) and accesses the configuration data store 446 (516) to determine whether the direct number of the call destination phone 420 is registered for call waiting service (518). If the direct number of the call destination phone 420 is not registered for call waiting service, the message transfer point 444 sends a destination number not validated response to the IVRS 442 (520). The IVRS 442 receives the destination phone number not validated response (522) and sends a no accept signal over the signaling channel to the PSTN 130 (524). In response to the no accept signal, the PSTN 130 sends a busy signal to the caller phone 410 and does not setup a voice path between the caller phone 410 and the IVRS 442 (526).). In another implementation, the IVRS 442 instructs the PSTN 130 to redirect the voice path to a direct number corresponding to a voice messaging or voice mail system rather than instructing the PSTN 130 to send a busy signal.

If the direct number of the call destination phone 420 is registered for call waiting service, the message transfer point 444 accesses the configuration data store 446 to identify an account based on the direct number of the call destination phone 420 (528) and to retrieve account-level preferences (530). The account may be identified, for example, by accessing an account record stored in the configuration data store 446 and indexed by direct number of call destination phone 120. The account-level preferences also may be included in the account record. The message transfer point 444 determines whether account-level preferences are applicable to the direct number of the caller phone 410 (532). If account-level preferences are applicable, then the message transfer point 444 performs operations 610-636 (FIG. 6) using the account-level preference option stored in the account record (534).

If account-level preferences are not applicable to the direct number of the caller phone 410 (e.g., the direct number of the caller phone 410 is not on a white list or a black list), or if appropriate, after applying account-level preferences, the message transfer point 444 accesses the account record stored in the configuration data store 446 to identify identities associated with the account (536). The message transfer point 444 accesses corresponding identity records to retrieve identity-level preferences (538).

The message transfer point 444 identifies which identities may be able to receive a call notification message based on the identity-level preferences (e.g., the direct number of the caller phone 410 may be on the prohibited list of some of the identities or parental controls may prohibit some of the identities from receiving a call notification message) (538). The message transfer point 444 sends a request to one or more of the presence servers 462 for the online status of the identified identity or identities in accordance with the corresponding notification distribution preferences (540).

The one or more presence servers 462 receive the request for the online status of the identified identities (542) and access the online status of the identified identities from a data store (544). The one or more presence servers 462 send the online status of the identified identities to the message transfer point 444 (546).

The message transfer point 444 receives the online status of the identified identity or identities (548) and determines whether at least one identified identity is online (550). If no identified identities are online, process 500 proceeds to operation 520. If at least one identified identity is online, the message transfer point 444 sends a destination phone number validated response to the IVRS 442 (552). The IVRS 442 receives the destination phone number validated response (554) and sends an accept signal over the signaling channel to the PSTN 430 (556). In response to the accept signal, the telephone network 430 sends a ringing signal to the caller phone 410 and sets up a voice path between the caller phone 410 and the IVRS 442 (558).

The message transfer point 444 accesses the configuration data store 446 to retrieve call notification format information corresponding to the identified identity or identities that are online (560). The call notification format information may be stored in the identity records as an identity-level call waiting preference. The message transfer point 444 generates a call notification message for each identity that is online in accordance with the retrieved call notification message formats (562) and sends the call notification messages to one or more of the alerts systems 464 in accordance with the notification distribution preferences of each identity (564).

The one or more alerts systems 464 receive the call notification messages (566) and send the call notification messages along with format data to call destination computer systems 470 corresponding to the online identities (568). The receiving of the call notification messages and sending of the call notification messages and format data are performed in real time.

Each call destination computer system 470 receives the call notification message and format data (570) and enables a user to perceive the call notification message (572). In one implementation, the call destination computer system 470 enables the user to perceive the call notification message as a pop-up window or dialog box that appears on a visual display of the call destination computer system 470.

Figure 6:
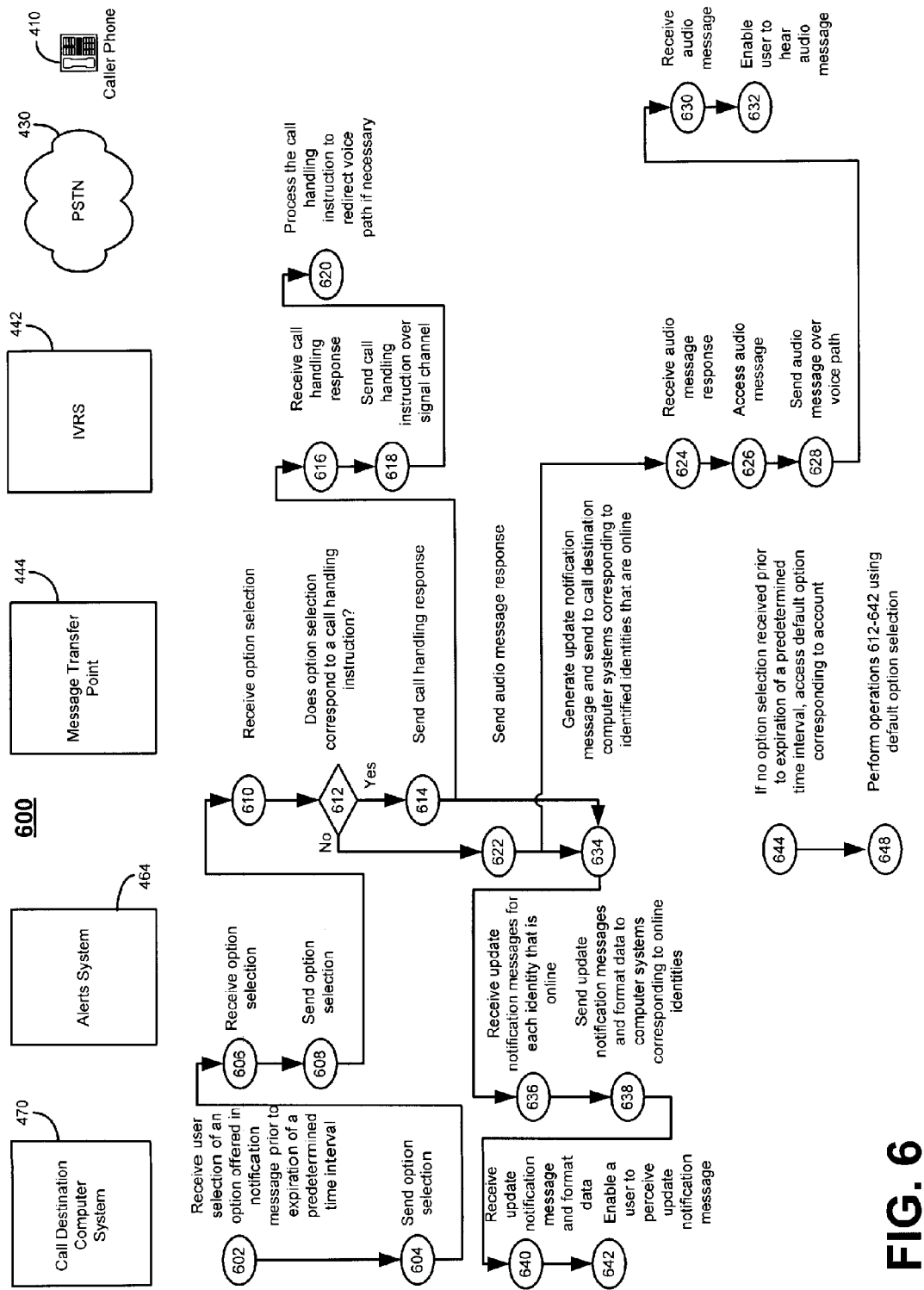
FIG. 6 is a flow chart illustrating a process for responding to a user selection of an option in a call notification message.

FIG. 6 shows a process 600 for responding to a user selection of an option in a call notification message. For ease of discussion, particular components described with respect to FIG. 4 are referenced as performing the process 600. However, similar methodologies may be applied in other implementations where different components are used to define the structure of the system, or where the functionality is distributed differently among the components shown by FIG. 4. Process 600 corresponds to process 300 but applied to the communications system 400 rather than to the communications system 100.

The call destination computer system 170 enables a user to select an option offered in the call notification message prior to expiration of a predetermined time interval (e.g., 15 seconds) (602). The call destination computer system 170 sends the option selection to the alerts system 464 (604).

The alerts system 464 receives the option selection (606) and sends the option selection to the message transfer point 444 (608). The alerts system 464 is configured to receive and send the option selection to the message transfer point 444 in real time.

The message transfer point 444 receives the option selection (610). The process 600 assumes that a "first come, first serve" conflict resolution algorithm is being used (i.e., the first option selection received is the option selection that will be used to process the call). However, if a rank-based conflict resolution algorithm is used, the message transfer point 444 waits for a predetermined interval of time (e.g., 15 seconds) to receive option selections from multiple call destination computers 470, determines which of the received options selections has been assigned the highest rank in accordance with identity-level preferences, and proceeds to operation 612 using the option selection corresponding to the option selection that has been assigned the highest rank.

The message transfer point 444 determines whether the option selection includes a call handling instruction (i.e., an instruction to forward or ignore the call) (612). If the option selection includes a call handling instruction, the message transfer point 444 sends a call handling response corresponding to the call handling instruction to the IVRS 442 (614). The call handling response may be, for example, an identification number used by the IVRS 442 to determine the call handling instruction that will be sent to the PSTN 430.

The IVRS 442 receives the call handling response (616) and sends a corresponding call handling instruction to the PSTN 430 over the signaling channel (618). The PSTN 430 processes the call handling instruction and, if necessary, forwards or redirects the voice path accordingly (620).

If the option selection does not correspond to a call handling instruction, then the message transfer point 444 sends an audio message response corresponding to the audio message to the IVRS 442 (622). The audio message response may be, for example, an identification number used by the IVRS 442 to identify the storage location of the audio message that will be sent to the caller phone 410.

The IVRS 442 receives the audio message response (624), accesses an audio message corresponding to the audio message response (626) and sends the audio message over the voice path to the caller phone 410 (628). The caller phone 410 receives the audio message (630) and enables a user to hear the audio message (632).

After sending a call handling response and/or an audio message response to the IVRS 442, the message transfer point 444 generates an updated call notification message for each identified identity that is online and sends the updated call notification messages to one or more of the alerts systems 464 in accordance with the corresponding notification distribution preferences of the respective identities (634). The one or more alerts systems 464 receive the updated call notification messages (636) and send the updated call notification messages to the corresponding call destination computer systems 470 (638). Each call destination computer system 470 receives an updated call notification message (640) and enables a user to perceive the updated call notification message (642).

If the message transfer point 444 does not receive an option selection after a predetermined interval of time from any of the call destination computer systems 470 that received call notification messages, the message transfer point 444 automatically accesses a default option selection corresponding to the account (and stored as an account-level preference) (644). The message transfer point 444 processes the default option selection in accordance with operations 612-642 (646).

A number of implementations have been described. Nevertheless, it will be understood that various modifications may be made. For example, the systems and processes refer to a voice path and a signaling channel. In some implementations, the voice path and the signaling channel are separated (i.e., out-of-band signaling). In other implementations, the voice path and the signaling channel are integrated into one channel (i.e., in-band signaling) that handles the transmission of audio data as well as the transmission of call handling data.

The telephone network 130 may be configured to always send a signal to the intelligent call waiting system 140, regardless of whether the call destination phone 120 is busy or is not answered. In response to the signal, the intelligent call waiting system 140 sends a call notification message to user identities associated with the call destination phone 120 that are online. In this manner, the user identities may monitor the use of the of the call destination phone 120. Such monitoring may be used, for example, to enable parental control of the call destination phone 120 (e.g., a father may want to known who has been calling his daughter).

One or more aspects of the intelligent call waiting system 140 may be replaced by one or more aspects of an intelligent call screening system, such as that described in U.S. patent application Ser. No. 10/674,821, filed Oct. 1, 2003, and titled INTELLIGENT CALL SCREENING OF TRADITIONAL TELEPHONY CALLS, hereby incorporated by reference in its entirety. In this implementation, the intelligent call screening system queries multiple online service provider systems in the manner described above to determine the online status of a call recipient. If the call recipient is online, the intelligent call screening system sends a call notification message through the online service provider systems in the same manner as discussed above for the call waiting system 140 (i.e., by applying call notification message distribution preferences). The call notification message presents various call handling options including an option to take a message. If the call recipient selects the option to take a message, the intelligent call screening system sends a call screening message to the call destination computer system through the online service provider systems. The call screening message is sent to the call destination computer system 170 in the same manner as that used to send the call notification message. The call screening message presents call handling options similar to those presented by the call notification message. The call screening message, however, enables the call recipient to select an option while simultaneously hearing the caller deposit a voicemail.

Furthermore, the network 150 may be replaced by multiple separate networks. Each separate network may be a different type of network (e.g., a wireless network or a cable network) and/or controlled by a different telecommunications or online service provider. One or more of the separate networks may connect or enable communications between one of the online service provider systems 160 and the call destination computer system 170 (i.e., the call destination computer system 170 may be in communication with multiple online service provider systems 160 over multiple separate networks). In addition, one or more of the online service provider systems 160 may be connected to or communicatively coupled with the intelligent call waiting system 140 over a separate network distinct from the networks through which the online service provider systems 160 communicate with the call destination computer system 170.

In another implementation, the intelligent call waiting system 140 provides the online service provider systems 160 with presence information related to the status of the call destination phone 120. For example, the intelligent call waiting system 140 may send information to the online service provider systems 160 indicating that the call destination phone is "receiving a phone call", "handling a call", "handling multiple calls", or "not receiving a phone call". The online service provider systems 160 may advertise this information to users as additional presence information. For example, the online service provider systems 160 may display the online presence of users on a "buddy list" and may provide an icon next to each user identity in the buddy list to indicate that the phone of that user is "receiving a phone call" or "not receiving a phone call." If the intelligent call waiting system 140 is integrated or in communication with a voicemail system, the presence information provided to the online service provider systems 160 may further include information related to whether the user identity has voicemails and the number of voicemails in their mailbox. The online service provider systems 160 may advertise this information using, for example, a message waiting indicator icon. The message waiting indicator icon also may display the number of voicemails in the mailbox.

Accordingly, other implementations are within the scope of the following claims.

What is claimed is:

1. A computer-implemented method for alerting an intended recipient of a phone call, the method comprising:
   identifying an account based on a phone call received from a caller;
   accessing configuration data related to the account;
   identifying several identities associated with the account based on the configuration data accessed, the several identities including a first identity and a second identity;
   accessing identity-level call preferences for the first identity; determining whether the first identity is available to receive a first electronic communication associated with the phone call based on the identity-level call preferences for the first identity;
   sending to the first identity the first electronic communication associated with the phone call conditioned on determining that the first identity is available to receive the first electronic communication;
   accessing identity-level call preferences for the second identity, the identity-level call preferences for the second identity being different from the identity-level call preferences for the first identity;
   determining whether the second identity is available to receive a second electronic communication associated with the phone call based on the identity-level call preferences for the second identity;
   sending to the second identity the second electronic communication associated with the phone call conditioned on determining that the second identity is available to receive the second electronic communication;
   receiving a third electronic communication from the first identity, responding to the first electronic communication;
   receiving a fourth electronic communication from the second identity, responding to the second electronic communication;
   resolving a conflict between the third electronic communication and the fourth electronic communication; and
   handling the phone call based on the conflict resolution.

2. The method of claim 1, wherein identifying the account based on the phone call comprises identifying the account based on a call destination telephone number to which the call is directed.

3. The method of claim 1, further comprising receiving call origin information that includes a caller phone number.

4. The method of claim 3, wherein at least a portion of the call origin information is sent to the first identity if the first identity is determined to be available to receive the first electronic communication, and at least a portion of the call origin information is sent to the second identity if the second identity is determined to be available to receive the second electronic communication, such that the first electronic communication and the second electronic communication each include at least a portion of the call origin information.

5. The method of claim 1, wherein:
   determining whether the first identity is available to receive the first electronic communication includes determining whether the first identity is online; and
   determining whether the second identity is available to receive the second electronic communication includes determining whether the second identity is online.

6. The method of claim 5, wherein identifying several identities including a first identity and a second identity comprises identifying several screen names for an instant messaging application including a first screen name and a second screen name.

7. The method of claim 1, wherein:
   accessing identity-level call preferences for the first identity comprises accessing a first block list maintained for the first identity;
   determining whether the first identity is available to receive the first electronic communication comprises:
      determining whether a phone number of the caller is included in the first block list, and
      determining that the first identity is not available conditioned on the phone number of the caller being included in the first block list;
   accessing identity-level call preferences for the second identity comprises accessing a second block list maintained for the second identity, the second block list being different from the first block list; and determining whether the second identity is available to receive the second electronic communication comprises:
  determining whether the phone number of the caller is included in the second block list, and
  determining that the second identity is not available conditioned on the phone number of the caller being included in the second block list.

8. The method of claim 1, wherein:
accessing identity-level call preferences for the first identity comprises accessing first parental controls associated with the first identity; and
accessing identity-level call preferences for the second identity comprises accessing second parental controls associated with the second identity, the second parental controls being different from the first parental controls.

9. The method of claim 8, wherein:
determining whether the first identity is available to receive the first electronic communication comprises determining whether the first parental controls effect restrictions for a phone number of the caller; and
determining whether the second identity is available to receive the second electronic communication comprises determining whether the second parental controls effect restrictions for the phone number of the caller.

10. The method of claim 8, wherein:
determining whether the first identity is available to receive the first electronic communication comprises determining whether the first parental controls effect restrictions for a phone number of the caller based on a time of day in which the call was received; and
determining whether the second identity is available to receive the second electronic communication comprises determining whether the second parental controls effect restrictions for the phone number of the caller based on the time of day in which the call was received.

11. The method of claim 1, wherein:
accessing identity-level call preferences for the first identity comprises accessing a first preferred caller list maintained for the first identity;
determining whether the first identity is available to receive the first electronic communication comprises:
  determining whether a phone number of the caller is included in the first preferred caller list, and
  determining that the first identity is available to receive the first electronic communication and available to receive the phone call at a first preferred communication device conditioned on the phone number of the caller being included in the first preferred caller list;
accessing identity-level call preferences for the second identity comprises accessing a second preferred caller list maintained for the second identity, the second preferred caller list being different from the first preferred caller list; and
determining whether the second identity is available to receive the second electronic communication comprises:
  determining whether the phone number of the caller is included in the second preferred caller list, and
  determining that the second identity is available to receive the second electronic communication and available to receive the phone call at a second preferred communication device conditioned on the phone number of the caller being included in the second preferred caller list.

12. The method of claim 1, wherein:
determining whether the first identity is available to receive the first electronic communication comprises querying one or more external online service providers across a network to determine whether the first identity is available to receive the first electronic communication; and
sending to the first identity the first electronic communication comprises sending across the network to the one or more external online service provider systems the first electronic communication conditioned on whether the first identity is determined to be available to receive the first electronic communication.

13. The method of claim 12, wherein
accessing identity-level call preferences for the first identity comprises accessing call notification distribution preferences for the first identity; and
determining whether the first identity is available to receive a first electronic communication comprises determining, based on the call notification distribution preferences, that the first identity is available to receive the first electronic communication through a first external online service provider system and not available to receive the first electronic communication through a second external online service provider system.

14. A computer system for alerting an intended recipient of a phone call, the computer system comprising:
a data store for storing configuration data;
a telephony interface element configured to receive a phone call from a caller: and
a call processing element configured to:
  identify an account based on the phone call;
  access the data store to retrieve configuration data related to the account;
  identify several identities associated with the account based on the configuration data accessed, the several identities including a first identity and a second identity;
  access identity-level call preferences for the first identity;
  determine whether the first identity is available to receive a first electronic communication associated with the phone call based on the identity-level call preferences for the first identity;
  send to the first identity the first electronic communication associated with the phone call conditioned on determining that the first identity is available to receive the first electronic communication;
  access identity-level call preferences for the second identity, the identity-level call preferences for the second identity being different from the identity-level call preferences for the first identity;
  determine whether the second identity is available to receive a second electronic communication associated with the phone call based on the identity-level call preferences for the second identity;
  send to the second identity the second electronic communication associated with the phone call conditioned on determining that the second identity is available to receive the second electronic communication;
  receive a third electronic communication from the first identity, responding to the first electronic communication;
  receive a fourth electronic communication from the second identity, responding to the second electronic communication;

resolve a conflict between the third electronic communication and the fourth electronic communication; and handle the phone call based on the conflict resolution.

15. A computer-implemented method for alerting an intended recipient of a phone call, the method comprising:
identifying an account based on a phone call received from a caller;
accessing configuration data related to the account;
identifying several identities associated with the account based on the configuration data accessed, the several identities including a first identity and a second identity;
accessing identity-level call preferences for the first identity;
determining first message contents for a first electronic communication associated with the call based on the identity-level call preferences for the first identity;
sending the first electronic communication to the first identity;
accessing identity-level call preferences for the second identity;
determining second message contents for a second electronic communication associated with the call based on the identity-level call preferences for the second identity, the second message contents being different from the first message contents; and
sending the second electronic communication to the second identity;
receiving a third electronic communication from the first identity, responding to the first electronic communication;
receiving a fourth electronic communication from the second identity, responding to the second electronic communication;
resolving a conflict between the third electronic communication and the fourth electronic communication; and
handling the phone call based on the conflict resolution.

16. The method of claim 15, wherein identifying an account based on a phone call comprises identifying an account based on a call destination telephone number to which the call is directed.

17. The method of claim 15, further comprising receiving call origin information that includes a caller phone number.

18. The method of claim 17, wherein the first electronic communication and the second electronic communication each include at least a portion of the call origin information.

19. The method of claim 15, wherein identifying several identities including the first identity and the second identity includes identifying a first user identifier through which an online status of a first user may be determined and a second user identifier through which an online status of a second user may be determined.

20. The method of claim 19, identifying several identities including a first identity and a second identity comprises identifying several screen names for an instant messaging application including a first screen name and a second screen name.

21. The method of claim 15, wherein:
determining first message contents comprises determining contents configured to inspire a first call notification display for presentation to a first user by a first call destination computer system, the first call notification display being configured to notify the first user of the phone call; and
determining second message contents comprises determining contents configured to inspire a second call notification display for presentation to a second user by a second call destination computer system, the second call notification display being configured to notify the second user of the phone call and being different from the first call notification display.

22. The method of claim 21, wherein:
determining contents configured to inspire a first call notification display includes determining, based on the identity-level call preferences for the first identity, first call processing options for display in the first call notification display, the first call processing options being selectable by the first user to process the phone call; and
determining contents configured to inspire a second call notification display includes determining, based on the identity-level call preferences for the second identity, second call processing options for display in the second call notification display, the second call processing options being selectable by the second user to process the phone call.

23. The method of claim 22, wherein determining the second call processing options includes determining second call processing options that include at least one option that is not included in the first call processing options.

24. The method of claim 22, wherein:
determining the first call processing options includes determining first call processing options that are specified by the first user, and
determining the second call processing options includes determining second call processing options that are specified by the second user.

25. The method of claim 22, wherein determining the first call processing options includes determining first call processing options that include an option selectable to forward the call to another phone number.

26. The method of claim 22, wherein determining the first call processing options includes determining first call processing options that include an option selectable to ignore the call.

27. The method of claim 22, wherein determining the first call processing options includes determining first call processing options that include an option selectable to send an audio message to the caller.

28. The method of claim 27, wherein determining the first call processing options includes determining first call processing options that include an option selectable to send an audio message to the caller that is selectable by the first identity from among multiple different audio messages.

29. The method of claim 28, wherein determining first call processing options includes determining first call processing options that include an option selectable to send an audio message to the caller that is selectable by the first identity from among multiple different audio messages, the multiple different audio messages including an audio message that informs the caller that the call is being redirected to another phone number.

30. The method of claim 28, wherein determining first call processing options includes determining first call processing options that include an option selectable to send an audio message to the caller that is selectable by the first identity from among multiple different audio messages, the multiple different audio messages including an audio message that informs the caller that the call will be answered by a call recipient shortly.

31. The method of claim 22, wherein determining the first call processing options includes determining first call processing options that include an option selectable to take a message from the caller.

32. The method of claim 31, further comprising recording an audio message from the caller as audio data, sending the audio data to the first call destination computer system while the caller is leaving the audio message, and, before the caller finishes leaving the audio message, enabling perception by the first user of the transmitted audio data.

33. The method of claim 32, further comprising enabling the first user to react to the phone call in response to the audio message.

34. The method of claim 33, wherein enabling the first user to react to the phone call includes generating a call screening message in response to the received phone call and sending the call screening message to the first call destination computer system before the phone call is terminated.

35. The method of claim 34, wherein the call screening message includes contents configured to inspire a first call screening display that includes first call screening options selectable by the first user to react to the phone call while the caller is leaving the audio message and before the caller finishes leaving the audio message.

36. The method of claim 35, wherein the first call screening options include an option selectable to send the phone call to a call destination.

37. The method of claim 35, wherein the call screening options include an option selectable to send an outbound audio message to be perceived by the caller.

38. A computer system for alerting an intended recipient of a phone call, the computer system comprising:
a data store for storing configuration data;
a telephony interface element configured to receive a phone call from a caller; and
a call processing element configured to:
identify an account based on a phone call received from a caller;
access the data store to retrieve configuration data related to the account;
identify several identities associated with the account based on the configuration data accessed, the several identities including a first identity and a second identity;
access identity-level call preferences for the first identity;
determine first message contents for a first electronic communication associated with the call based on the identity-level call preferences for the first identity;
send the first electronic communication to the first identity;
access identity-level call preferences for the second identity;
determine second message contents for a second electronic communication associated with the call based on the identity-level call preferences for the second identity, the second message contents being different from the first message contents;
send the second electronic communication to the second identity;
receive a third electronic communication from the first identity, responding to the first electronic communication;
receive a fourth electronic communication from the second identity, responding to the second electronic communication;
resolve a conflict between the third electronic communication and the fourth electronic communication; and
handle the phone call based on the conflict resolution.

* * * * *